United States Patent
Bandara et al.

(10) Patent No.: US 9,898,757 B2
(45) Date of Patent: Feb. 20, 2018

(54) PURCHASE SUPPORT SERVER, PURCHASE SUPPORT METHOD, PURCHASE SUPPORT PROGRAM, AND COMPUTER-READABLE RECORDING MEDIUM FOR RECORDING SAID PROGRAM

(75) Inventors: Udana Bandara, Shinagawa-ku (JP); James Chen, Shinagawa-ku (JP)

(73) Assignee: Rakuten, Inc., Setagaya-ku, Tokyo (JP)

( * ) Notice: Subject to any disclaimer, the term of this patent is extended or adjusted under 35 U.S.C. 154(b) by 768 days.

(21) Appl. No.: 13/984,690

(22) PCT Filed: Feb. 1, 2012

(86) PCT No.: PCT/JP2012/052289
§ 371 (c)(1),
(2), (4) Date: Aug. 9, 2013

(87) PCT Pub. No.: WO2012/124398
PCT Pub. Date: Sep. 20, 2012

(65) Prior Publication Data
US 2013/0346200 A1    Dec. 26, 2013

(30) Foreign Application Priority Data

Mar. 11, 2011    (JP) .................................. 2011-054308

(51) Int. Cl.
| | | |
|---|---|---|
| *G06Q 30/00* | (2012.01) | |
| *G06Q 30/02* | (2012.01) | |
| *G06Q 30/06* | (2012.01) | |

(52) U.S. Cl.
CPC ..... *G06Q 30/0255* (2013.01); *G06Q 30/0207* (2013.01); *G06Q 30/0601* (2013.01)

(58) Field of Classification Search
CPC ........... G06Q 30/0601–30/0645; G06Q 30/08; G06Q 30/0255; G06Q 30/0207

(Continued)

(56) References Cited

U.S. PATENT DOCUMENTS

| | | | | |
|---|---|---|---|---|
| 2010/0082455 | A1* | 4/2010 | Rosenblatt | G06Q 30/02 705/26.1 |
| 2011/0276385 | A1* | 11/2011 | Keller | G06Q 20/202 705/14.38 |
| 2012/0072274 | A1* | 3/2012 | King | G06Q 30/0214 705/14.16 |

FOREIGN PATENT DOCUMENTS

| | | |
|---|---|---|
| EP | 1528492 A1 | 5/2005 |
| EP | 2157738 A1 | 2/2010 |

(Continued)

OTHER PUBLICATIONS

Debra D. Bass, "App we love", St. Louis Post-Dispatch; Nov. 7, 2010.*

(Continued)

*Primary Examiner* — Michael Misiaszek
*Assistant Examiner* — Katherine O'Sullivan
(74) *Attorney, Agent, or Firm* — Sughrue Mion, PLLC

(57) ABSTRACT

A mediation server (30) includes a second request receiving unit (35) that receives first store information for identifying a store visited by a user as a visited store and second store information for identifying a designated store designated as a place to purchase an item recognized by the user at the visited store from a mobile terminal (10) of the user, a response information generating unit (36) that compares the first and second store information and determines whether the visited store and the designated store match, and generates bargaining information indicating a specified service offered for the item by the visited store when the two stores do not match, and a response information transmission unit (37) that transmits the generated bargaining information to the mobile terminal (10).

12 Claims, 14 Drawing Sheets

| ITEM S YOU ARE LOOKING FOR CAN BE PURCHASED BELOW | | | |
|---|---|---|---|
| STORE NAME | TOTAL PRICE | TIME TO ACQUISITION | REMARKS |
| STORE A | ¥6800 | 3 DAYS | DOUBLE POINTS (136 PTS) |
| STORE B | ¥6250 | 7 DAYS | NORMAL POINTS (62 PTS) |
| STORE C | ¥7000 | IMMEDIATE | CREDIT CARD PAYMENT AVAILABLE THROUGH SITE A (70 PTS) |

(58) Field of Classification Search
USPC .............................................. 705/26.1–27.2
See application file for complete search history.

(56) References Cited

FOREIGN PATENT DOCUMENTS

| JP | 2000-250842 A | 9/2000 |
| JP | 2003-016349 A | 1/2003 |
| JP | 2008-065363 A | 3/2008 |
| JP | 2009-048284 A | 3/2009 |
| WO | 2006094086 A | 9/2006 |

OTHER PUBLICATIONS

Maki Masuda, "Amazon official appli which mounts "Photo Search" enjoys high popularity [@maskin]," http://techwave.jp/archives/51461554.html, Jun. 7, 2010.
"Amazon provides an appli for iPhone for free. "Photo Search" using a camera is also available," http://web-tan.forum.impressrd.jp/e/2010/18/8185, Jun. 18, 2010.
International Search Report dated Apr. 24, 2012, issued in International Patent Application No. PCT/JP2012/052289.
International Preliminary Report on Patentability with Written Opinion dated Sep. 26, 2013, issued in PCT/JP2012/052289.

\* cited by examiner

Fig.3

| ITEMS YOU ARE LOOKING FOR CAN BE PURCHASED BELOW | | | | P |
|---|---|---|---|---|
| STORE NAME | TOTAL PRICE | TIME TO ACQUISITION | REMARKS | |
| STORE A | ¥6800 | 3 DAYS | DOUBLE POINTS (136 PTS) | |
| STORE B | ¥6250 | 7 DAYS | NORMAL POINTS (62 PTS) | |
| STORE C | ¥7000 | IMMEDIATE | CREDIT CARD PAYMENT AVAILABLE THROUGH SITE A (70 PTS) | |

| ITEM NAME | ITEM ID | STORE ID | PRICE |
|---|---|---|---|
| ITEM S | 3333 | 110(STORE A) | ¥6000 |
| ITEM S | 4444 | 120(STORE B) | ¥5000 |
| ITEM S | 5555 | 130(STORE C) | ¥7000 |

(b)

| CATALOGUE ID | ITEM ID | STORE ID | PRICE |
|---|---|---|---|
| AAAA | 3333 | 110(STORE A) | ¥6000 |
| AAAA | 4444 | 120(STORE B) | ¥5000 |
| AAAA | 5555 | 130(STORE C) | ¥7000 |

*Fig.8*

| VISITED STORE ID | PURCHASE STORE ID | REMUNERATION RATE |
|---|---|---|
| 130(STORE C) | 110(STORE A) | 5% |
| 130(STORE C) | 120(STORE B) | 5% |

ITEMS YOU ARE LOOKING FOR CAN BE PURCHASED BELOW

| STORE NAME | TOTAL PRICE | TIME TO ACQUISITION | REMARKS |
|---|---|---|---|
| STORE A | ¥6800 | 3 DAYS | DOUBLE POINTS (136 PTS) |
| STORE B | ¥6250 | 7 DAYS | NORMAL POINTS (62 PTS) |
| STORE C | | IMMEDIATE | CREDIT CARD PAYMENT AVAILABLE THROUGH SITE A (70 PTS) |

PURCHASE SUPPORT SERVER, PURCHASE SUPPORT METHOD, PURCHASE SUPPORT PROGRAM, AND COMPUTER-READABLE RECORDING MEDIUM FOR RECORDING SAID PROGRAM

CROSS REFERENCE TO RELATED APPLICATIONS

This is a National Stage of International Application No. PCT/JP2012/052289 filed Feb. 1, 2012, claiming priority based on Japanese Patent Application No. 2011-054308 filed Mar. 11, 2011, the contents of all of which are incorporated herein by reference in their entirety.

TECHNICAL FIELD

One embodiment of the present invention relates to a purchase support server, a purchase support method, a purchase support program, and a computer-readable recording medium for recording said program.

BACKGROUND ART

Various systems for supporting shopping of users are known. For example, Patent Literature 1 below discloses a shopping support system that supports users to make efficient shopping by taking the price of an item to be purchased and the transportation cost for shopping into account. Further, the mechanism that searches for the same or similar items based on the photograph of an item taken by a camera-equipped mobile terminal and provides a search result to the terminal is known (see Non Patent Literatures 1 and 2 below). Thus, combining these techniques makes it possible to present an item corresponding to a photograph taken by a user in a store visited and the prices of the item in different stores, and thereby help the user to decide from which store to purchase the item.

CITATION LIST

Patent Literature

PTL 1: JP 2009-48284 A

Non Patent Literature

NPL 1: Masaki Masuda, "Amazon's Offial Apps with "Photo Search" Gaining Popularity", [online], Jun. 7, 2010 [searched on Aug. 24, 2010], Internet <URL: http://techwave.jp/archives/51461554.html>
NPL 2: "Free iPhone Apps Offered by Amazon, Including "Photo Search" using Camera", [online], Jun. 18, 2010 [searched on Aug. 24, 2010], Internet <URL: http://web-tan.forum.impressrd.jp/e/2010/06/18/8185>

SUMMARY OF INVENTION

Technical Problem

However, implementation of the above decision support raises the case where a user purchases an item which the user has photographed in a store visited (which is an actual store in the real world, also referred to as "real store" in this specification) from another store through online shopping. For example, there can be a case where a user purchases an item from another store that offers the lower price than the store visited through online shopping. In this case, the real store in which the item sold there has been photographed cannot gain any profit despite that its own item has been photographed (for example, it cannot even collect the item display cost) and is thus likely to get dissatisfied.

In view of the foregoing, when a user intends to purchase an item recognized in a visited store from another store, it is desirable to provide the visited store with an opportunity to make bargaining with the user.

Solution to Problem

A purchase support server according to one aspect of the present invention includes a receiving means for receiving first store information for identifying a store visited by a user as a visited store and second store information for identifying a designated store designated as a place to purchase an item recognized by the user at the visited store from a mobile terminal of the user, a determining means for comparing the first and second store information received by the receiving means and determining whether the visited store and the designated store match, a generating means for generating service information indicating a specified service offered for the item by the visited store when the visited store and the designated store do not match, and a transmitting means for transmitting the service information generated by the generating means to the mobile terminal.

A purchase support method according to one aspect of the present invention is a purchase support method executed by a purchase support server, the method including a receiving step of receiving first store information for identifying a store visited by a user as a visited store and second store information for identifying a designated store designated as a place to purchase an item recognized by the user at the visited store from a mobile terminal of the user, a determining step of comparing the first and second store information received in the receiving step and determining whether the visited store and the designated store match, a generating step of generating service information indicating a specified service offered for the item by the visited store when the visited store and the designated store do not match, and a transmitting step of transmitting the service information generated in the generating step to the mobile terminal.

A purchase support program according to one aspect of the present invention causes a computer to function as a receiving means for receiving first store information for identifying a store visited by a user as a visited store and second store information for identifying a designated store designated as a place to purchase an item recognized by the user at the visited store from a mobile terminal of the user, a determining means for comparing the first and second store information received by the receiving means and determining whether the visited store and the designated store match, a generating means for generating service information indicating a specified service offered for the item by the visited store when the visited store and the designated store do not match, and a transmitting means for transmitting the service information generated by the generating means to the mobile terminal.

A computer-readable recording medium according to one aspect of the present invention stores a purchase support program causing a computer to function as a receiving means for receiving first store information for identifying a store visited by a user as a visited store and second store information for identifying a designated store designated as a place to purchase an item recognized by the user at the visited store from a mobile terminal of the user, a determining means for comparing the first and second store information received by the receiving means and determining whether the visited store and the designated store match, a generating means for generating service information indicating a specified service offered for the item by the visited store when the visited store and the designated store do not match, and a transmitting means for transmitting the service information generated by the generating means to the mobile terminal.

According to the above-described aspects, it is determined whether a store where a user has recognized an item (visited store) and a store where the user has designated as a place to purchase the item (designated store) match or not. When the both stores do not match, information indicating a service for the item offered by the visited store is transmitted to a mobile terminal of the user. The transmission of the information indicating the service is one aspect for the visited store to make bargaining with a user, and the visited store can thereby let the user reconsider the place to purchase the item. In other words, when a user intends to purchase an item recognized at the visited store from another store, it is possible to provide the visited store with an opportunity to make bargaining with the user.

In the purchase support server according to another aspect, the generating means may transmit inquiry information for making inquiries about a detail of the service to the visited store to a terminal of the visited store, receive input information indicating the detail of the service input in response to the inquiry information from the terminal, and generate the service information based on the input information. The store can thereby notify the detail of the bargaining to a user.

In the purchase support server according to another aspect, the generating means may determine whether the detail of the service indicated by the input information is within a predetermined allowable range, and generate the service information when the detail of the service is within the allowable range. It is thereby possible to promote the visited store to input the detail of the reasonable service.

In the purchase support server according to another aspect, the generating means may extract store service information corresponding to the visited store from a database storing store service information indicating the service offered by a store, and generate the service information based on the extracted store service information. In this manner, by automatically generating the service information, the visited store can save the trouble of inputting the detail of the service each time.

In the purchase support server according to another aspect, the store service information may contain an accumulated value related to offer of the service and an upper limit value related to an upper limit of offer of the service, and the generating means may generate the service information based on the extracted store service information when the accumulated value does not exceed the upper limit value by the service to be offered. It is thereby possible to avoid placing an excessive burden on the visited store.

In the purchase support server according to another aspect, the generating means may extract store service information corresponding to the visited store by referring to a database storing store service information containing an accumulated value related to a service offered by a store and an upper limit value set based on remuneration received by the store from another store, and generate the service information based on the store service information when the accumulated value does not exceed the upper limit value by the service to be offered. The visited store can thereby offer a service within the range of the upper limit that is set based on the received remuneration.

The purchase support server according to another aspect may further include a presented information providing means for generating presented information indicating a store selling an item corresponding to item-related information by searching a specified database storing information indicating stores selling an item based on the first store information and the item-related information for identifying the item received from the mobile terminal, and transmitting the presented information to the mobile terminal, the stores selling an item including the visited store and a different store from the visited store, and the designated store may be one store selected from the visited store and the different store. A user can thereby compare a plurality of stores selling an item and decide which store to purchase the item.

The purchase support server according to another aspect may further include a giving means for generating user remuneration information indicating giving a specified amount of remuneration to the user and storing the user remuneration information into a specified database when the item-related information is information read by the mobile terminal at the visited store. In such a scheme, it is possible to promote the purchase through the purchase support service to a user.

The purchase support server according to another aspect may further include a payment recording means for generating payment information indicating a specified amount of payment from the visited store to an administrator of the purchase support server based on information indicating purchase and storing the payment information into a specified database when a user of the mobile terminal having received the service information purchases the item from the visited store. An administrator of the purchase support server can thereby obtain a specified profit.

Advantageous Effects of Invention

According to one aspect of the present invention, when a store where a user has recognized an item and a store where the user has designated as a place to purchase the item do not match, information indicating a service for the item by the visited store is transmitted to a mobile terminal of the user. Accordingly, when the user intends to purchase an item recognized in the visited store from another store, it is possible to provide the visited store with an opportunity to make bargaining with the user.

BRIEF DESCRIPTION OF DRAWINGS

FIG. 3 is a diagram showing a display example of presented information in a mobile terminal.

FIGS. 7(a)(b) are diagrams showing examples of price data.

FIG. 8 is a diagram showing an example of remuneration data.

DESCRIPTION OF EMBODIMENTS

Figure 1:
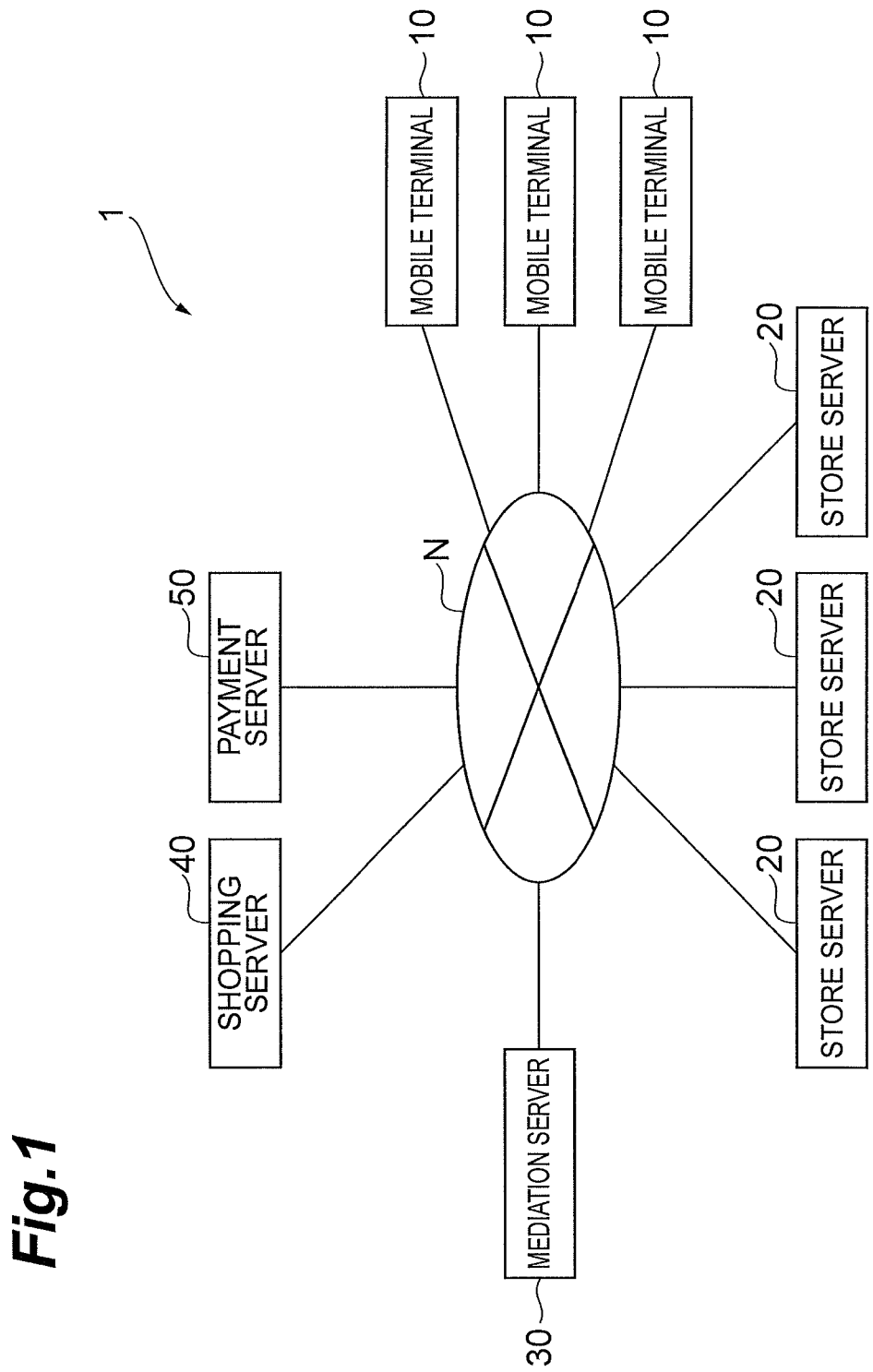
FIG. 1 is a diagram showing an overall configuration of a purchase support system according to an embodiment.

An embodiment of the present invention is described hereinafter in detail with reference to the appended drawings. Note that, in the description of the drawings, the same or equivalent elements are denoted by the same reference symbols, and the redundant explanation thereof is omitted.

Functions and operation of a purchase support system 1 according to an embodiment are described hereinafter with reference to FIGS. 1 to 8. The purchase support system 1 is a computer system that presents information about a purchase-available item (at least information about an item, a store selling the item, and a purchase cost) in response to a request from a user who has visited a real store. The purchase support system 1 includes a mobile terminal 10 that is owned by a user, a store server 20, a mediation server (purchase support server) 30, a shopping server 40, and a payment server 50.

The store server 20 is a computer that is deployed in each store and manages information about the sales, stock and the like in the store. The store server 20 may be a personal computer. The mediation server 30 is a computer that searches for a purchase-available item in response to a request from the mobile terminal 10 and transmits a search result to the mobile terminal 10. The shopping server 40 is a computer that provides an electronic mall web site (online shopping site) and stores information about the sales, stock and the like in each of stores of the electronic mall (each store may or may not have the store server 20). A user can purchase an item through the site provided by the shopping server 40. The payment server 50 is a computer that provides an online payment site, and a user can make a credit card payment through the payment site when purchasing an item in a real store.

The mobile terminal 10, the store server 20, the mediation server 30, the shopping server 40 and the payment server 50 can communicate with one another through a communication network N that is the Internet, a wireless LAN, a mobile communication network or the like. Although three mobile terminals 10 and three store servers 20 are shown in FIG. 3, the number of those devices in the purchase support system 1 is arbitrary.

Note that administrators (agents) that manage the mediation server 30, the shopping server 40 and the payment server 50 may be the same or different.

Figure 2:
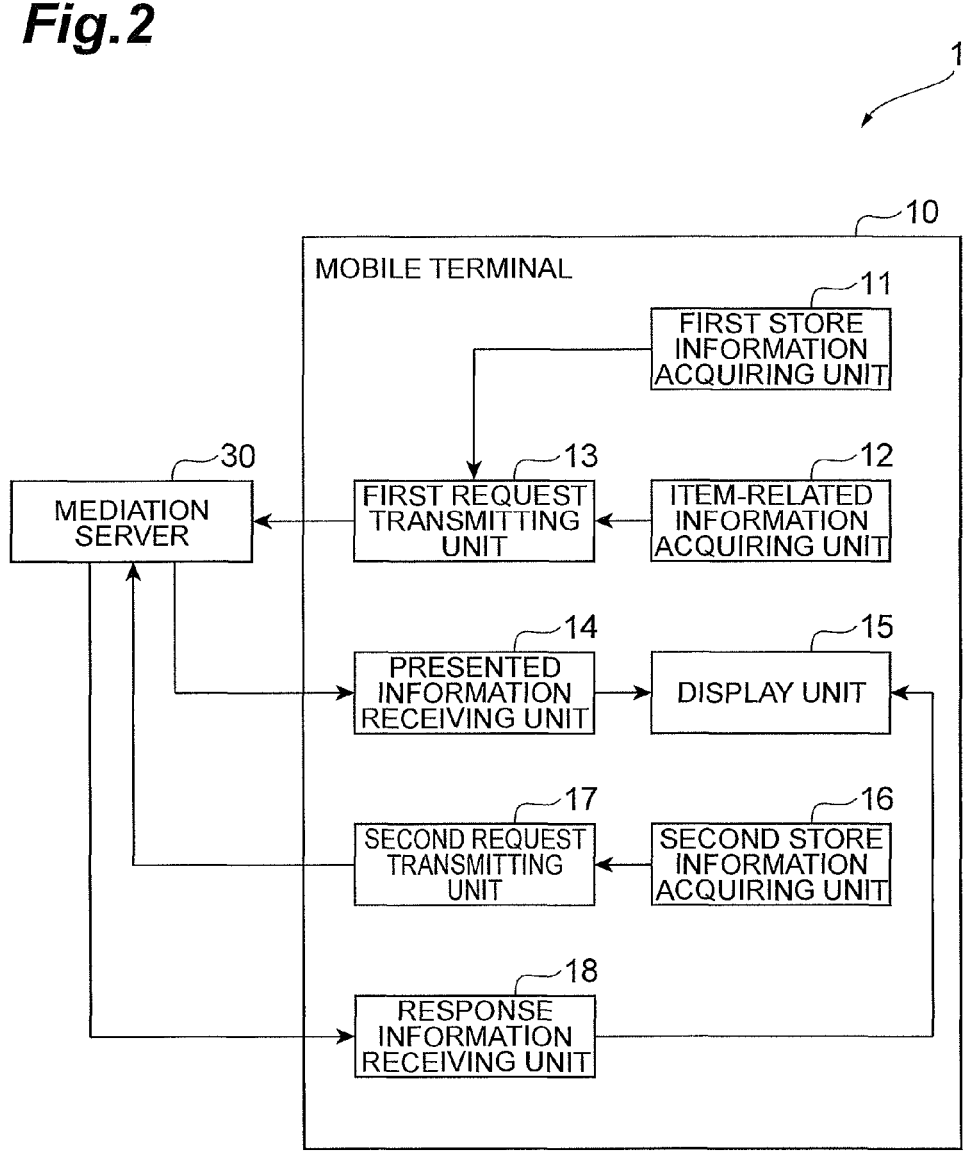
FIG. 2 is a block diagram showing a functional configuration of a mobile terminal shown in FIG. 1.

The mobile terminal 10 is described firstly. Referring to FIG. 2, the mobile terminal 10 includes a first store information acquiring unit 11, an item-related information acquiring unit 12, a first request transmitting unit 13, a presented information receiving unit 14, a display unit 15, a second store information acquiring unit 16, a second request transmitting unit 17, and a response information receiving unit 18 as functional elements. The mobile terminal 10 may be a sophisticated mobile phone (smartphone) or personal digital assistant (PDA) with a camera, for example, though the type of the mobile terminal is not limited thereto.

The first store information acquiring unit 11 is a means of acquiring store-related information (first store information) to be used for identifying a real store (visited store) where a user has visited. The first store information acquiring unit 11 acquires the information by the following method when user operation for acquiring store-related information is made.

For example, the first store information acquiring unit 11 may acquire a store ID that is embedded in a barcode (for example, two-dimensional barcode) presented at a store as the store-related information. In this case, the first store information acquiring unit 11 may be configured as a camera, barcode analysis program or the like. The store ID is information that uniquely identifies a store.

Further, the first store information acquiring unit 11 may acquire a store ID that is stored in an IC tag placed at a store as the store-related information. In this case, the first store information acquiring unit 11 may be configured as an RFID (Radio Frequency IDentification) tag reader or the like.

Furthermore, the first store information acquiring unit 11 may be configured using a position acquiring means such as a GPS (Global Positioning System) receiver, and position information (latitude and longitude) indicating the position of the mobile terminal 10 may be used as the store-related information. In this case, it is necessary to specify a store corresponding to the position information on the mediation server 30 side.

In this embodiment, it is assumed that the first store information acquiring unit 11 acquires a store ID. The first store information acquiring unit 11 outputs the acquired store ID (which is hereinafter referred to also as "visited store ID") to the first request transmitting unit 13.

The item-related information acquiring unit 12 is a means of acquiring item-related information to be used for identifying an item recognized by a user in a real store (visited store). Recognition of an item by a user means that the user actually sees the item and pays attention to (becomes interested in) it.

In this embodiment, it is assumed that the item-related information acquiring unit 12 acquires photographic data as the item-related information. When a user takes a photograph of an item with a camera incorporated in the mobile terminal 10, the item-related information acquiring unit 12 acquires the photographic data of the item and outputs it to the first request transmitting unit 13. Note that the photograph may be any photograph as long as it allows an item to be identified by image recognition in the mediation server 30, and it may be a photograph of the entire item, a scale-up photograph of the item showing information (for example, an item name) that uniquely identifies the item, a photograph of an item tag with an item name on it and the like. With use of such photographic data, a user can obtain the item-related information simply by taking a photograph of the item, which enhances the user-friendliness of the purchase support system 1.

The first request transmitting unit 13 is a means of generating a first request signal that contains the input visited store ID and photographic data (item-related information) and transmitting the first request signal to the mediation server 30.

The presented information receiving unit 14 is a means of receiving presented information that is transmitted from the mediation server 30 in response to transmission of the first request signal. The presented information is a list of presented items extracted by the mediation server 30 on the basis of the photograph of the item transmitted by the first request transmitting unit 13, and it is information indicating the item name, store selling the item, purchase cost, time to acquisition, and points obtained by purchase for each of the items. The presented item is an item which is the same as or similar to the item in the photograph. Further, the "similar item" is an item which is different from the item in the photograph but is similar in appearance or the same in category or attribute as the item in the photograph. Generation of the presented information in the mediation server 30 is described later. The presented information receiving unit 14 outputs the received presented information to the display unit 15.

The display unit 15 is a means of displaying the presented information that is input from the presented information receiving unit 14 or bargaining information that is input from the response information receiving unit 18, which is described later, on a monitor of the mobile terminal 10.

The presented information is displayed as a screen P as shown in FIG. 3, for example. The screen P tells that there are three stores (stores A, B and C) that sell a presented item S and that the purchase cost (total price), time to acquisition, and points are different among the stores. In this manner, a plurality of stores selling the item are extracted for one presented item in some cases. The underline for each store name indicates a hyperlink, and the store ID that identifies a store is embedded in the link. The purchase cost is the amount including shipping and remuneration charges, as appropriate, in addition to the price (base price) of the item.

The store C in FIG. 3 is a visited store, which is apparent from the fact that the time to acquisition is "immediate" indicating that the item S can be received at the store. When a user purchases the item S in the store C, the user can select payment by cash at the store or payment with a credit card through an online payment site (site A) provided by the payment server 50. The hyperlink for the store C is to access the online payment site.

On the other hand, the stores A and B are stores different from the visited store. The hyperlinks for the stores A and B are to access an online shopping site (site provided by the shopping server 40) of the selected store, and a user can go through a purchase procedure of the presented item in the site. In this embodiment, however, when either of the hyperlinks of the stores A and B is clicked on, a screen based on bargaining information, which is described later, is displayed on the monitor before accessing the site of the corresponding store (see FIG. 4). The "time to acquisition" for the stores A and B indicates the time until the item S is shipped from the store and arrives at the user's end. Note that a store different from the visited store may be a store that exists only as a store on an online shopping site (virtual store) or a store that exists also as a real store.

Although only the information about one presented item (item S) is shown in FIG. 3, the presented information may include information about a plurality of presented items, and, in this case, another presented item is displayed by scrolling or page turning. The presented information may include both information about the same item as an item photographed by a user and information about the similar item to the item, and a user interface (for example, a switch button) for selectively displaying the two types of information may be placed on a screen.

Figure 4:
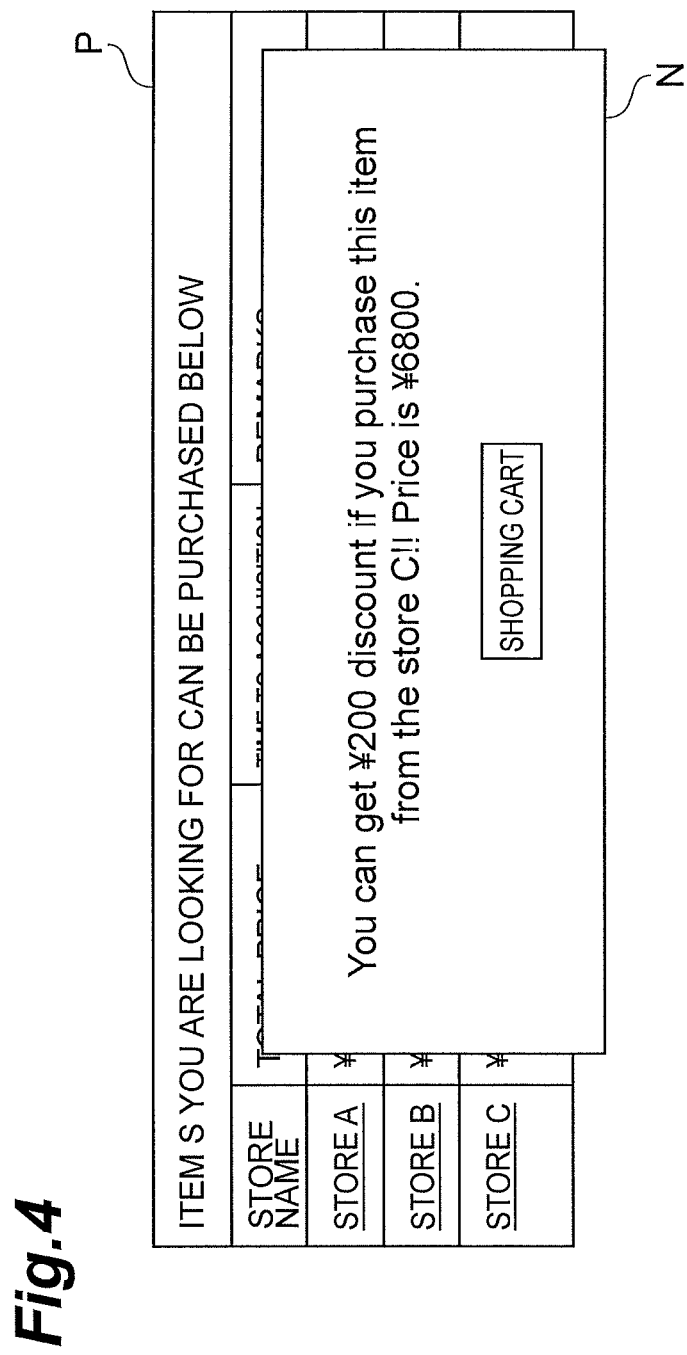
FIG. 4 is a diagram showing a display example of bargaining information in a mobile terminal.

On the other hand, the bargaining information is displayed as a screen N as shown in FIG. 4, for example. Although the screen N is displayed in a pop-up window on the screen P in the example of FIG. 4, the way of displaying the bargaining information is not limited thereto. For example, the display unit 15 may change the screen of the presented information into the screen of the bargaining information. The screen N is displayed when a user intends to purchase the item S which the user has recognized at the visited store C from either of other stores A and B. The bargaining information is described in detail later.

Referring back to FIG. 2, the second store information acquiring unit 16 is a means of acquiring a store ID (second store information) that identifies a store that is designated as a place to purchase an item by a user who has viewed the presented information. In this specification, a store that is designated as a place to purchase an item is referred to as "designated store", and its ID is referred to as "designated store ID" hereinbelow. When one store is designated as a place to purchase an item on the screen based on the presented information, the second store information acquiring unit 16 acquires the store ID corresponding to that store as the designated store ID. Further, the second store information acquiring unit 16 acquires the item ID of the item selected as an item to be purchased and the visited store ID (which is the store ID of the store C in the example of FIG. 3) contained in the presented information. Then, the second store information acquiring unit 16 outputs the designated store ID, the visited store ID and the item ID to the second request transmitting unit 17.

The second request transmitting unit 17 is a means of generating a second request signal that contains the input designated store ID, visited store ID and item ID and transmitting the second request signal to the mediation server 30.

The response information receiving unit 18 is a means of receiving response information transmitted from the mediation server 30 in response to the transmission of the second request signal. The response information includes payment guide information for guiding the mobile terminal 10 to the payment process at the visited store and bargaining information for letting a user consider purchase at the visited store. The bargaining information is service information that is presented to a user when a store different from the visited store is designated as a place to purchase an item and indicates a specified service offered for the item by the visited store. The response information receiving unit 18 outputs the received bargaining information to the display unit 15, and thereby the bargaining information is displayed on the monitor as shown in FIG. 4.

The screen N shown in FIG. 4 is displayed as a result that a user has selected either of the stores A and B as a place to purchase the item S. The screen N shows that, when the item S is purchased at the visited store C, the store C takes off ¥200 from ¥7000, which is the original total price (see FIG. 3). A user can access an online payment site ("site A" shown in FIG. 3) for purchasing the item S from the store C by pressing the "Shopping Cart" button in the screen N. Then, the user can obtain the benefit indicated by the bargaining information (¥200 discount in the example of FIG. 4). On the other hand, the user can access a webpage for purchasing the item S from the originally designated store (store A or B) by cancelling the screen N.

Although the bargaining information that indicates a service that discounts the purchase price is displayed in the example of FIG. 4, the detail of the service indicated by the bargaining information is not limited to the price discount but may be set arbitrarily. For example, a service that gives bonus points or more points than usual, a service that offers free shipping, a service that takes an old item for replacement, a service that extends the warranty period and the like may be presented as the bargaining information.

Figure 5:
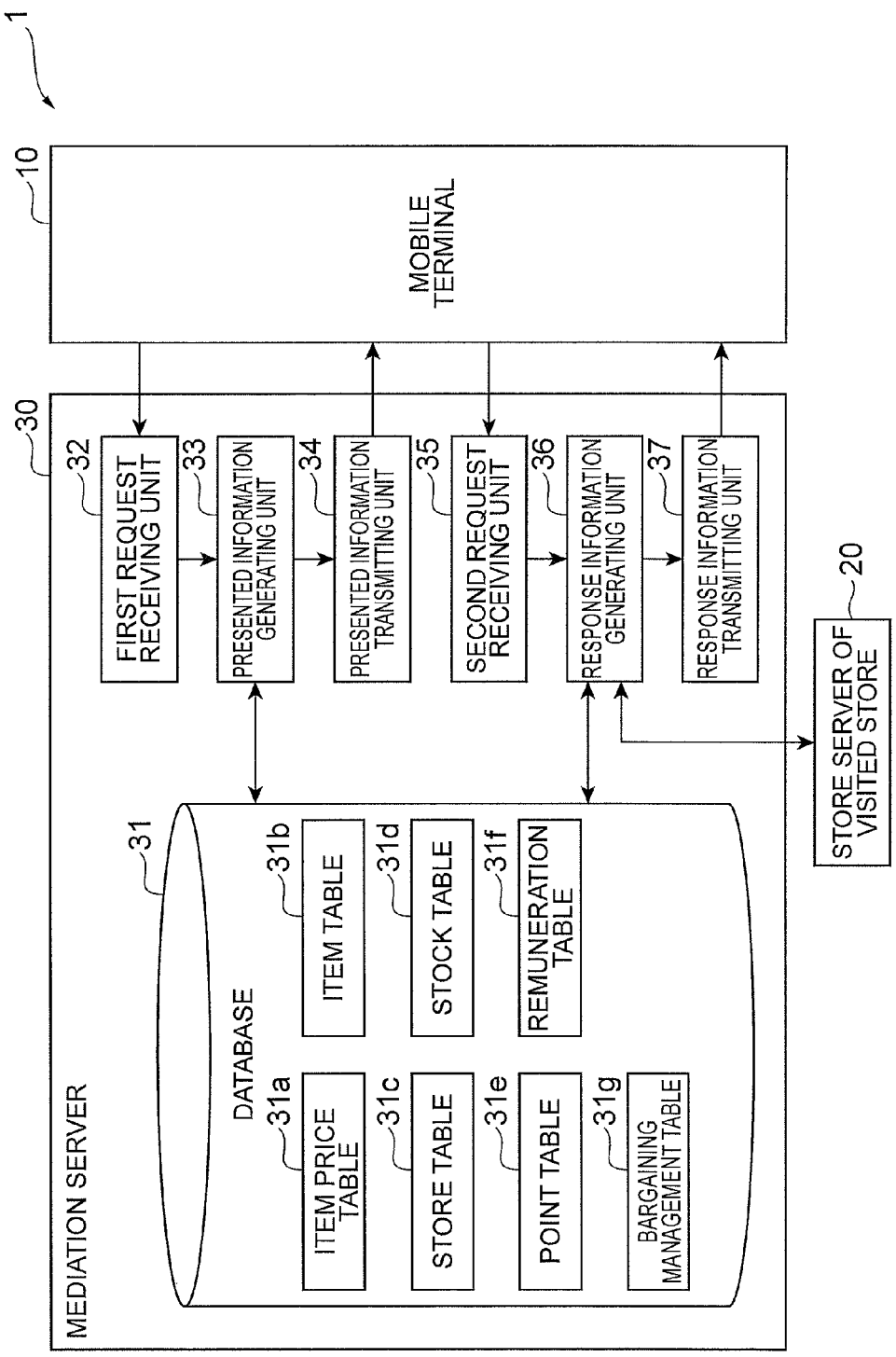
FIG. 5 is a block diagram showing a functional configuration of a mediation server shown in FIG. 1.

The mediation server 30 is described next. Referring to FIG. 5, the mediation server 30 includes a database 31, a first request receiving unit 32, a presented information generating unit 33, a presented information transmitting unit 34, a second request receiving unit (receiving means) 35, a response information generating unit (determining means, generating means) 36, and a response information transmitting unit (transmitting means) 37 as functional elements.

Figure 6:
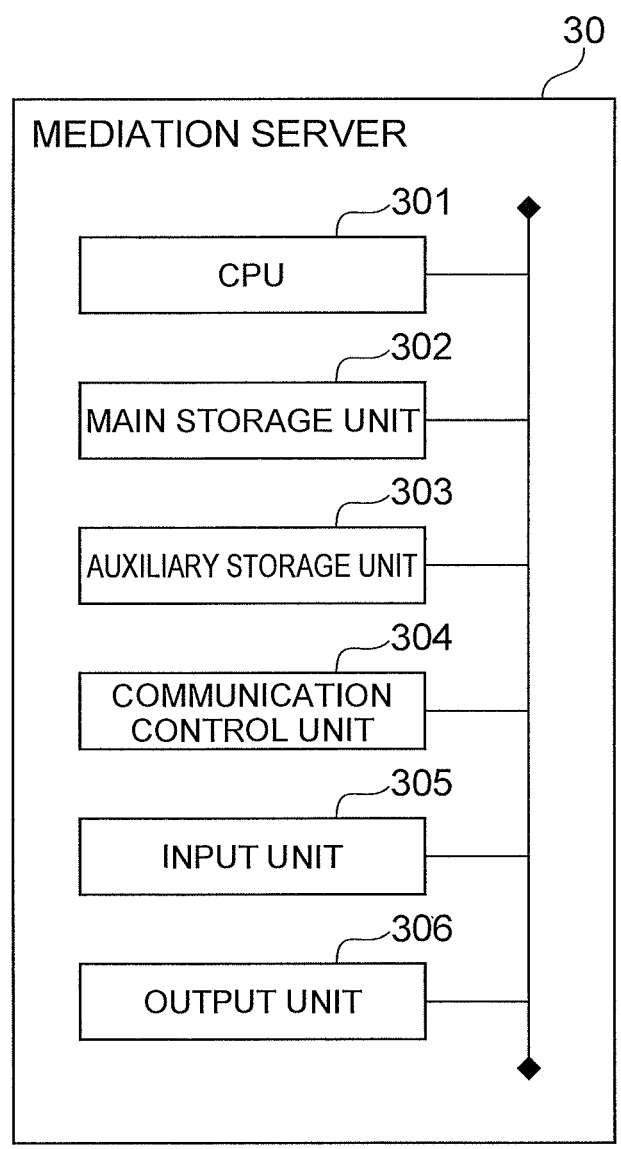
FIG. 6 is a diagram showing a hardware configuration of the mediation server shown in FIG. 1.

The mediation server 30 is composed of a CPU 301 that executes an operating system, an application program and the like, a main storage unit 302 such as ROM and RAM, an auxiliary storage unit 303 such as a hard disk, a communication control unit 304 such as a network card, an input unit 305 such as a keyboard and a mouse, and an output unit 306 such as a monitor as shown in FIG. 6. The functions shown in FIG. 4 are implemented by reading given software onto the CPU 301 or the main storage unit 302, causing the communication control unit 304, the input unit 305, the output unit 306 and the like to operate under control of the CPU 301, and performing data reading and writing in the main storage unit 302 or the auxiliary storage unit 303. Data and database required for the processing is stored in the main storage unit 302 or the auxiliary storage unit 303.

Note that, although the mediation server 30 is a single computer in the example of in FIG. 6, the functions of the mediation server 30 may be distributed among a plurality of computers. For example, the database 31 may be implemented in another server, separately from the mediation server 30.

Referring back to FIG. 5, the database 31 is a means of storing various kinds of data required for processing in the mediation server 30, and it includes an item price table 31a, an item table 31b, a store table 31c, a stock table 31d, a point table 31e, a remuneration table 31f, and a bargaining management table 31g.

The item price table 31a stores price data in which the item name or catalogue ID that uniquely identifies an item, the item ID that is uniquely assigned to the item by a store selling the item, the store ID of the store selling the item, and the base price of the item in the store selling the item are associated with one another. Thus, the price data is data indicating the base prices of an item in stores selling the item. For example, assuming that the store IDs of the stores A, B and C selling the item S shown in FIG. 3 are "110", "120" and 130", respectively, and the item IDs of the item S in the stores A, B and C are "3333", "4444" and 5555", respectively, the price data corresponding to the presented information shown in FIG. 3 is represented as shown in FIG. 7(a). If the catalogue ID "AAAA" is assigned to the item S, the price data may be generated using the catalogue ID instead of the item name as shown in FIG. 7(b). Note that the catalogue ID may be the model number of an item. The total price in FIG. 3 and the base price in FIG. 7 are different because there is a case where the purchase cost presented to a user includes the amount different from the base price as described later.

The item table 31b stores item data indicating basic information of items. The item data is made up of the item name or catalogue ID that uniquely identifies an item and entries indicating item attributes (item name, category, manufacturer name, size, color etc.). Note that the varieties of item attributes indicated by the item data may be set arbitrarily.

The store table 31c stores store data indicating basic information of a store. The store data is made up of the store ID and entries indicating store attributes (store name, group name, address or map information, telephone number, URL for online shopping, delivery company, delivery time needed for each region etc.), which is uniquely identified by the store ID. Note that the varieties of store attributes indicated by the store data may be set arbitrarily.

The stock table 31d stores stock data in which the item name or catalogue ID, the item ID, the store ID of a store selling the item, and the stock quantity of the item in the store selling the item are associated with one another. Thus, the stock data is data indicating the number of items remaining in each store. The stock data is updated based on item stock data transmitted from each of the store servers 20 or the shopping server 40 at specified timing.

The point table 31e stores point data indicating how many points are awarded to a user in each store at the time of item purchase. The structure of the point data is determined according to the way points are awarded. For example, when points are set on the item-by-item basis, the point data is uniquely identified by the item name or catalogue ID, and, when points are set on the store-by-store basis, the point data is uniquely identified by the store ID. Further, when points of each item is set on the basis of the base price in each store, the point data is uniquely identified by the item name or catalogue ID, the item ID and the store ID. The structure of the point data is not limited to those examples and may be set arbitrarily.

The remuneration table 31f stores remuneration data indicating the amount of remuneration paid from one store to another store when a user purchases in one store an item corresponding to the item recognized in another store (real store). Because the real store in which the displayed item is photographed by a user is considered to contribute to the sales of the one store, it is preferred to distribute a part of the sales to the real store. The distributed amount is defined as remuneration in this invention. For a user, the remuneration is a commission to the real store which is incurred by actually checking the item in the visited store.

The remuneration data may have different structures depending on the method of determining the remuneration amount. FIG. 8 shows an example of the structure of the remuneration data. The example of FIG. 8 shows that the remuneration rate that is applied to the base price of an item is set according to a combination of a visited store and a purchase store. In this example, when a user purchases the item S that has been recognized in the store C from the store A, ¥300 (5% of ¥6000) is paid from the store A to the store C. Even when the remuneration is defined not by a specific amount but by a ratio to the base price, the remuneration data is still data indicating the remuneration amount.

The remuneration rate may be determined by an arbitrary method. In the example of FIG. 8, weights may be applied to the remuneration rate on the basis of attributes of a visited store or a purchase store. The attributes of a store may be the relationship between a visited store and a purchase store (for example, whether both stores are in the same group or not), the customer-attracting power or location conditions of a visited store (for example, whether the store is located in a busy area), the display cost of an item with the land prices or tenant fees for a visited store taken into account, the delivery distance or shipping costs from a store purchased to a delivery destination and the like. For example, when the both stores are in the same group or in cooperative relationships, the remuneration rate may be set lower (for example, 1%) than a standard value (for example, 5%), and when the both stores are in competitive relationships, the remuneration rate may be set higher (for example, 10%) than the standard value. In this manner, it is possible to ensure equitability between stores by setting an appropriate remuneration rate according to store attributes. Note that varieties of the store attributes based on which the remuneration rate is determined is not limited to the above examples.

As a different method from FIG. 8, the remuneration rate may be set based only on one of a visited store and a purchase store. In this case, the remuneration rate is uniquely identified by one store ID. Further, the remuneration rate or remuneration amount may be set based only on item attributes such as a price. In this case, the remuneration data is uniquely identified by the item name or catalogue ID.

The negotiation management table 31*g* stores bargaining management data (store service information) that is used to automatically generate the bargaining information in the mediation server 30. The bargaining management data may be in various forms as described below.

For example, the bargaining management data may be composed of the upper limit of the discount amount for each specified period (for example, per day), the total discount amount (accumulated amount) at the present time in the store, and the discount rate or the awarded points (for example, 10% discount or extra 5% points awarded) per transaction in the store. In this case, the bargaining management data is data that specifies the upper limit of the discount amount or the awarded points for each period in each store, which is uniquely identified by the store ID. Further, the bargaining management data may be composed of the store ID, the item ID, and the discount amount, the discount rate or the awarded points per transaction. In this case, the bargaining management data is data that specifies the extent of a service for each store and each item, which is uniquely identified by the store ID and the item ID.

Alternatively, the bargaining management data may be composed of the upper limit of the discount amount for each specified period, the total discount amount at the present time in the store, one or more user IDs, and the discount rate or the awarded points set for each user. In this case, the bargaining management data is data that specifies the upper limit of the discount for each period in each store and further specifies the detail of the service for each user, and the detail of the service is uniquely identified by the store ID and the user ID. Further, the bargaining management data may be composed of the store ID, the user ID, the item ID, and the discount amount, the discount rate or the awarded points when the user purchases the item. In this case, the bargaining management data is data that specifies the detail of the service for each store, each user and each item, which is uniquely identified by the store ID, the user ID and the item ID.

Alternatively, the bargaining management data may be composed of the store ID, the upper limit of the discount amount on the basis of the remuneration amount received from another store, and the total discount amount at the present time. In this case, the bargaining management data is data that specifies the upper limit of the total discount amount on the basis of the received remuneration amount, which is uniquely identified by the store ID. In other words, this bargaining management data specifies the upper limit of the remuneration base. In this case, the visited store may offer a service such as price reduction within the range of the upper limit that is set based on the received remuneration.

For example, it is assumed that the upper limit and the total discount amount for a store J are ¥100,000 and ¥0, respectively. Then, it is assumed that a user who has recognized a certain item at the store J purchases that item from another store K through the purchase support system 1, and consequently the remuneration of ¥500 is paid from the store K to the store J. In this case, the bargaining management data of the store J is updated so that its upper limit becomes ¥100,500. After that, when the store J presents the discount of ¥800 as the bargaining information in another transaction at the store J and thereby the transaction is established, the total discount amount in the bargaining management data of the store J is updated to ¥800. After that, if the upper limit and the total discount amount in the bargaining management data for the store J become ¥100,500 and ¥100,000, respectively, the store J cannot present the discount amount of more than ¥500 to a user.

The bargaining management data that specifies the upper limit of the remuneration base may be as follows. First, the bargaining management data may be composed of the store ID, the upper limit of the discount amount on the basis of the remuneration amount, the total discount amount, and the discount rate or the awarded points for each transaction. In this case, the bargaining management data is uniquely identified by the store ID. Further, the bargaining management data may be composed of the store ID, the upper limit of the discount amount on the basis of the remuneration amount, the total discount amount, one or more user IDs, and the discount rate or the awarded points set for each user. In this case, the detail of the service is uniquely identified by the store ID and the user ID.

Note that the store may increase the upper limit by purchasing the reserve for discount from an administrator of the purchase support system 1 (mediation server 30), other than by obtaining the remuneration from other stores. Note that, although the upper limit and the total discount amount are used for the bargaining management data that specifies the upper limit of the remuneration base in this embodiment, the upper limit and the accumulated value may be set using another type of value such as points.

The form of the bargaining management data is not limited to the above examples but may be set arbitrarily as a matter of course. For example, the bargaining management data that specifies a service related to shipping discount or free shipping may be used.

Note that the structure of the database 31 and the structure of data of each table are not limited to the above-described examples, and the database may be designed by an arbitrary policy. For example, the price data and the stock data may be integrated.

The first request receiving unit 32 is a means of receiving a first request signal that contains a visited store ID and photographic data from the mobile terminal 10. The first request receiving unit 32 outputs the received first request signal to the presented information generating unit 33.

The presented information generating unit 33 is a means of generating presented information based on the first request signal input from the first request receiving unit 32.

The presented information generating unit 33 extracts the visited store ID and the photographic data from the input signal. The presented information generating unit 33 then executes image recognition on the photographic data and thereby estimates an object (item shape and color, item name, catalogue ID etc.), then compares the estimation result with the item data in the item table 31*b* to thereby identify the item indicated by the photographic data. For this process, the related art as disclosed in the above-described Non Patent Literatures 1 and 2 may be used. The item (presented item) identified in this process may be the item in the photograph (the same item as the object) or an item similar to the item in shape or color (the similar item to the object). Further, there is a case where a plurality of items are identified from the photographic data, and, in this case, both of the same item and the similar item may be included. In any case, the presented information generating unit 33 specifies the item name or catalogue ID of one or more presented items by such a process.

Then, the presented information generating unit 33 refers to the item price table 31a, the item table 31b, the store table 31c and the stock table 31d using the visited store ID and the specified item name or catalogue ID as the search criteria. The presented information generating unit 33 then generates a list of presented item data in which the presented item, the store having a stock of the item, the delivery time ("time to acquisition" in FIG. 3) and the purchase cost (=base price+ shipping charge) in the store selling the item excluding remuneration are associated with one another. Note that, however, because there is no shipping charge in the case of purchasing the item in the visited store, when the store ID of the store selling the item matches the visited store ID, the purchase cost equals the base price. The shipping charge and the delivery time can be found based on information about the locations of the visited store and the store selling the item, and the delivery company and delivery time needed of the store selling the item. Note that, when there are a plurality of delivery methods for one item and one store and accordingly there are a plurality of patterns of shipping charges and delivery time, the presented information generating unit 33 may generate a plurality of presented item data for one item and one store.

After that, the presented information generating unit 33 refers to the remuneration table 31f using the store ID of the item-selling store and the visited store as the search criteria for each of the presented item data and adds the remuneration amount obtained by multiplying the base price by the extracted remuneration rate to the purchase cost. The final purchase cost ("total price" in FIG. 3) is thereby obtained. Note that, however, because there is no remuneration in the case of purchasing the item in the visited store for the presented item data in which the item-selling store is the visited store, the addition of the remuneration amount is not made.

As described above, in the case of purchasing an item in a visited store, the base price of the item is the purchase cost, and, in the case of purchasing an item in a store different from a visited store, the amount including the shipping charge and the remuneration amount to the visited store in addition to the base price of the item is the purchase cost. The example shown in FIGS. 3, 7 and 8 means that the purchase cost in each store is calculated as follows when presenting information of the presented item S to a user who has visited the store C and photographed the item.

Store A: base price (¥6000)+shipping charge (¥500)+ remuneration (¥300)=¥6,800

Store B: base price (¥5000)+shipping charge (¥1000)+ remuneration (¥250)=¥6,250

Store C: base price (¥7000)

Then, the presented information generating unit 33 refers to the point table 31e for each of the presented item data and adds information about points to be displayed in a remarks column of FIG. 3 to the presented item data.

The presented information generating unit 33 outputs a set of presented item data generated in the above procedure as the presented information to the presented information transmitting unit 34.

In addition to generating the presented information as described above, the presented information generating unit 33 may give a user of the mobile terminal 10 a predetermined amount of remuneration for taking a photograph of an item in the visited store. In other words, the presented information generating unit 33 may serve also as a giving means. Specifically, the presented information generating unit 33 generates user remuneration information that contains the user ID that identifies a user of the mobile terminal 10 and the remuneration to be given to the user and stores the user remuneration information into a specified table (not shown) in the database 31. Examples of the remuneration include points, coupons and the like that are available for the next purchase, though the type of the remuneration is not particularly limited. In such a scheme, it is possible to promote the use of the purchase support system 1 to a user.

The presented information transmitting unit 34 is a means of transmitting the presented information input from the presented information generating unit 33 to the mobile terminal 10. The presented information is thereby displayed on the mobile terminal 10 as described above. Thus, the first request receiving unit 32, the presented information generating unit 33, and the presented information transmitting unit 34 serve as a presented information providing means.

The second request receiving unit 35 is a means of receiving the second request signal that contains the designated store ID, the visited store ID and the item ID from the mobile terminal 10. The second request receiving unit 35 outputs the received second request signal to the response information generating unit 36.

The response information generating unit 36 is a means of generating the response information based on the second request signal input from the second request receiving unit 32. The response information generating unit 36 extracts the designated store ID, the visited store ID and the item ID from the input signal. The response information generating unit 36 then determines whether the designated store ID and the visited store ID match or not.

When the designated store ID and the visited store ID match, it means that an instruction that the item is to be purchased from the visited store has been input in the mobile terminal 10 (in the example of FIG. 3, a user has selected the store C). In this case, the response information generating unit 36 generates payment guide information and outputs it to the response information transmitting unit 37. The payment guide information is an instruction for the mobile terminal 10 to access the online payment site of the visited store as a part of the procedure to purchase the item from the visited store.

On the other hand, when the designated store ID and the visited store ID do not match, it means that an instruction that the item is to be purchased from a store different from the visited store has been input in the mobile terminal 10 (in the example of FIG. 3, a user has selected either of the stores A and B). In this case, the response information generating unit 36 generates bargaining information. There are several methods of generating the bargaining information.

As a first method, the response information generating unit 36 uses the bargaining information that is input by a staff of the visited store. In this case, the response information generating unit 36 transmits a request for inputting bargaining information (inquiry information) to the store server 20 of the visited store. The request contains the presented information (see FIG. 3) that is already generated in the presented information generating unit 33. The request may further contain the user ID that identifies the user who intends to purchase the item. The user ID may be acquired from HTTP Cookie or the like. In response to the request, a staff of the visited store performs an operation to input and transmit the bargaining information. When the request contains the user ID, the staff can input the bargaining information by using user information (for example, information indicating whether the user is a regular customer or not) as a reference. In the example of FIG. 4, the staff has input the information "You can get a ¥200 discount if you purchase this item from the store C!! Price is ¥6800". Receiving this operation, the store server 20 transmits the bargaining information (input information) to the mediation server 30.

The response information generating unit 36 analyzes the received bargaining information and determines whether the detail of the service input in the visited store is within predetermined criteria. The criteria (allowable limits) that are previously set for the determination may be the range related to the price reduction and the awarded points. Specifically, the criteria for eliminating substantially meaningless price reduction (for example, price reduction of only ¥1), excessive price reduction (for example, 90% price reduction) or the like are prepared. Note that, however, the criteria may be set arbitrarily in consideration of the common business practice or the like. By setting such criteria, it is possible to promote the reasonable bargaining to the store.

When the input detail of the service is within the predetermined criteria, the response information generating unit 36 outputs the received bargaining information as it is to the response information transmitting unit 37. On the other hand, when the input detail of the service is outside the predetermined criteria, the response information generating unit 36 transmits a request for re-inputting bargaining information to the store server 20 of the visited store. The process related to the re-inputting is the same as described above.

In the case where the bargaining management data specifies the upper limit of the remuneration base, the response information generating unit 36 further determines whether the result of adding the input discount amount to the total discount amount at the present time exceeds the upper limit or not. When the result of the addition is equal to or less than the upper limit, the response information generating unit 36 outputs the received bargaining information as it is to the response information transmitting unit 37. On the other hand, when the result of the addition is more than the upper limit, the response information generating unit 36 transmits a request for re-inputting bargaining information to the store server 20 of the visited store.

Note that the response information generating unit 36 may output the received bargaining information as it is to the response information transmitting unit 37 without making the determination on the detail of the service as described above. In any case, the store can notify the detail of the bargaining to a user in the above method.

As a second method, the response information generating unit 36 may generate the bargaining information automatically by reference to the bargaining management table 31g without making inquiries to the visited store. In this case, the response information generating unit 36 acquires information for uniquely identifying the bargaining management data. The information acquired at this time at least contains the visited store ID and further contains the item ID and the user ID acquired from Cookie or the like according to need. Then, the response information generating unit 36 extracts the bargaining management data corresponding that information from the bargaining management table 31g and generates the bargaining information based on the data.

For example, the response information generating unit 36 reads the base price of the item corresponding to the visited store ID and the item ID from the item price table 31a. Further, the response information generating unit 36 calculates the discount amount of the item by subtracting the result of multiplying the base price by the discount rate indicated by the extracted bargaining management data or the discount amount indicated by the bargaining management data from the base price. The response information generating unit 36 then generates the bargaining information containing the discount amount and outputs it to the response information transmitting unit 37. In the example of FIG. 4, the response information generating unit 36 generates the bargaining information "You can get a ¥200 discount if you purchase this item from the store C!! Price is ¥6800".

In the above-described response information generating process, in the case where the upper limit of the discount amount is set in the bargaining management data (including the case where the bargaining management data specifies the upper limit of the remuneration base), the response information generating unit 36 performs the following process. Specifically, the response information generating unit 36 determines whether the result of adding the calculated discount amount to the total discount amount at the present time is equal to or less than the upper limit of the discount amount or not. Then, only when the result of the addition is equal to or less than the upper limit, the response information generating unit 36 generates the bargaining information and outputs the information to the response information transmitting unit 37. On the other hand, when the result of the addition is more than the upper limit, the response information generating unit 36 outputs the null bargaining information to the response information transmitting unit 37 so that the screen N as shown in FIG. 4 is not displayed.

Further, the response information generating unit 36 may set the discount amount automatically in accordance with the presented price (the total price in FIG. 3; the purchase cost for a user) at the store selected in the mobile terminal 10. In this case, the second request signal transmitted from the mobile terminal 10 further contains the presented price at the designated store, and the response information generating unit 36 sets the discount amount by referring to this presented price as well.

As one example, the response information generating unit 36 may set the discount amount so that the presented price at the visited store is equal to or less than the presented price at the designated store. For example, in the example of FIG. 3, the response information generating unit 36 may generate the bargaining information that sets the presented price at the store C to ¥6800 or less when another store A is selected, and generate the bargaining information that sets the presented price at the store C to ¥6250 or less when another store B is selected.

In the above process, in the case where the upper limit of the discount amount is set, the response information generating unit 36 generates the bargaining information in accordance with the presented price at the designated store within the range not exceeding the upper limit. For example, in the example of FIG. 3, it is assumed that the maximum allowable discount amount is ¥400 from the upper limit of the overall discount in the store C or the upper limit of the discount for the item S in the store C. In this case, the response information generating unit 36 generates the bargaining information that sets the presented price at the store C to any amount between ¥6600 to ¥6800 when another store A is selected, and generates the bargaining information that sets the presented price at the store C to ¥6600 when another store B is selected. Specifically, in the case where the result of reducing the presented price at the visited store to the lowest possible amount does not fall below the presented price at another store, the response information generating unit 36 sets the result of subtracting the maximum allowable discount amount from the original presented price as the presented price at the visited store.

In this manner, by setting the upper limit to the discount, it is possible to prevent the profit of the visited store from being taken excessively.

As a result that the bargaining information is automatically generated as described above, a staff of the visited store can save the trouble of inputting the bargaining information each time. Note that, however, when the result of the addition exceeds the upper limit, the response information generating unit 36 may provide a staff of the visited store with an opportunity to input the bargaining information in the same manner as in the above-described first method.

The response information transmitting unit 37 is a means of transmitting the payment guide information or the bargaining information input from the response information generating unit 36 to the mobile terminal 10. When the non-null bargaining information is transmitted, the information is displayed on the mobile terminal 10 as described above. When, on the other hand, the null bargaining information is transmitted, the screen N is not displayed, and the mobile terminal 10 accesses the online shopping site for purchasing the item from the selected store.

Hereinafter, an operation of the purchase support system 1 shown in FIG. 1 is described and further a purchase support method according to this embodiment is described with reference to FIGS. 9 and 10.

Figure 9:
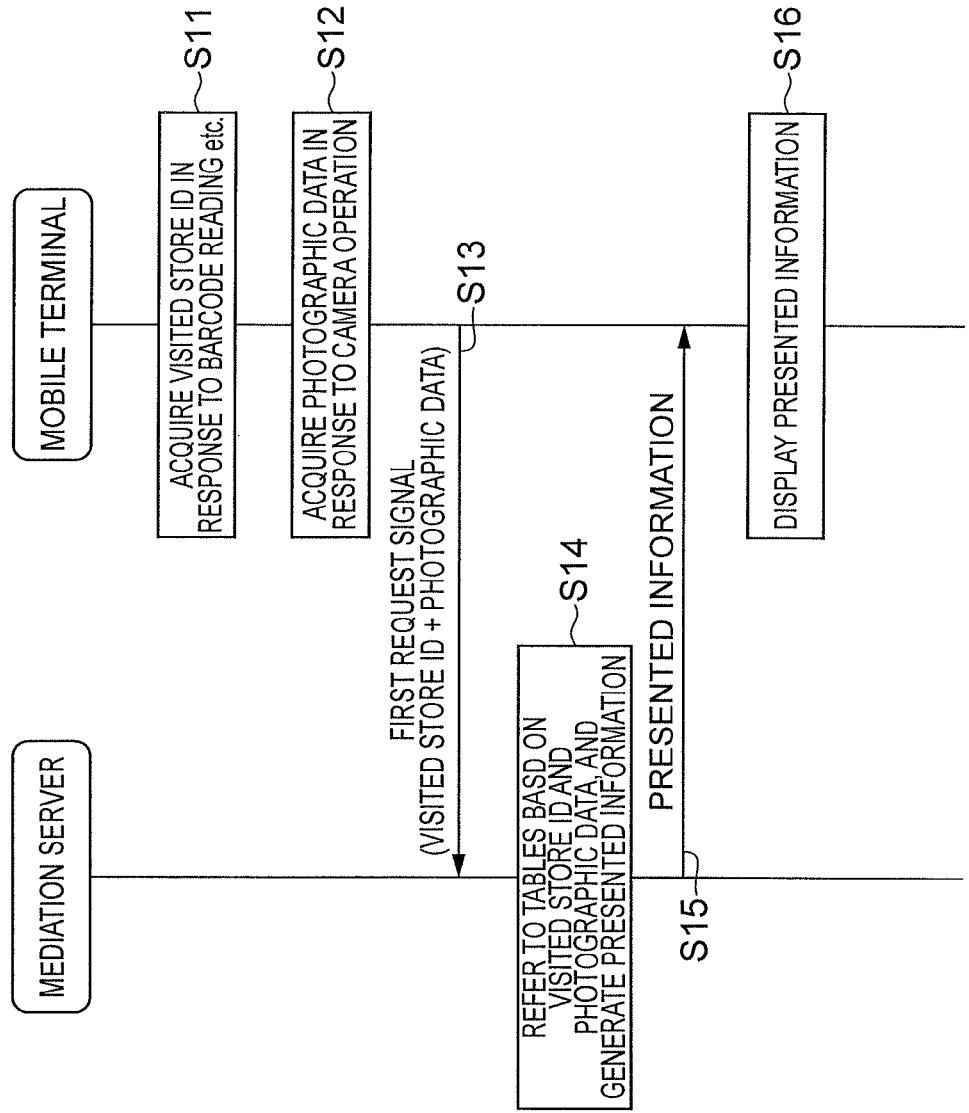
FIG. 9 is a sequence chart showing an operation of the purchase support system shown in FIG. 1.

The display of the presented item is performed as shown in FIG. 9. Assume that a user who has visited a certain store becomes interested in an item displayed in the store and runs an application program for acquiring presented information which is installed in the mobile terminal 10 in order to find where and how much to purchase the same or similar item. After that, according to the guidance of the program, the user reads a barcode presented in the store and takes a photograph of the item which the user found interesting.

At this time, in the mobile terminal 10, the first store information acquiring unit 11 acquires the visited store ID from the read barcode (Step S11), and the item-related information acquiring unit 12 acquires the photographic data of the item (Step S12). Then, the first request transmitting unit 13 generates a first request signal containing the visited store ID and the photographic data and transmits the signal to the mediation server 30 (Step S13).

In the mediation server 30, the first request receiving unit 32 receives the first request signal. Then, the presented information generating unit 33 refers to the database 31 based on the visited store ID and the photographic data extracted from the request signal and generates presented information (Step S14). Specifically, the presented information generating unit 33 estimates the item in the photograph by the image recognition process and, by reference to the item table 31b, specifies the item name or catalogue ID of the estimated item (presented item). Then, the presented information generating unit 33 refers to each of the tables in the database 31 based on the visited store ID and the item name or catalogue ID, and generates presented information. As described above, the generation process includes calculation of the remuneration amount and the purchase cost, retrieval of points and the like. After the presented information is generated, the presented information transmitting unit 34 transmits the information to the mobile terminal 10 (Step S15).

In the mobile terminal 10, the presented information receiving unit 14 receives the presented information, and the display unit 15 displays the information on the monitor as in the example of FIG. 3 (Step S16). A user can thereby check the stores selling the same or similar item to the item which the user found interesting in the visited store and the purchase cost at each store and then determine which item to purchase in which store. Because additional information such as time to acquisition (delivery time) and points are also presented, the user can make a consideration about purchasing the item from various angles. This means that the purchase support system 1 can support the user's item purchase in an elaborate manner.

Figure 10:
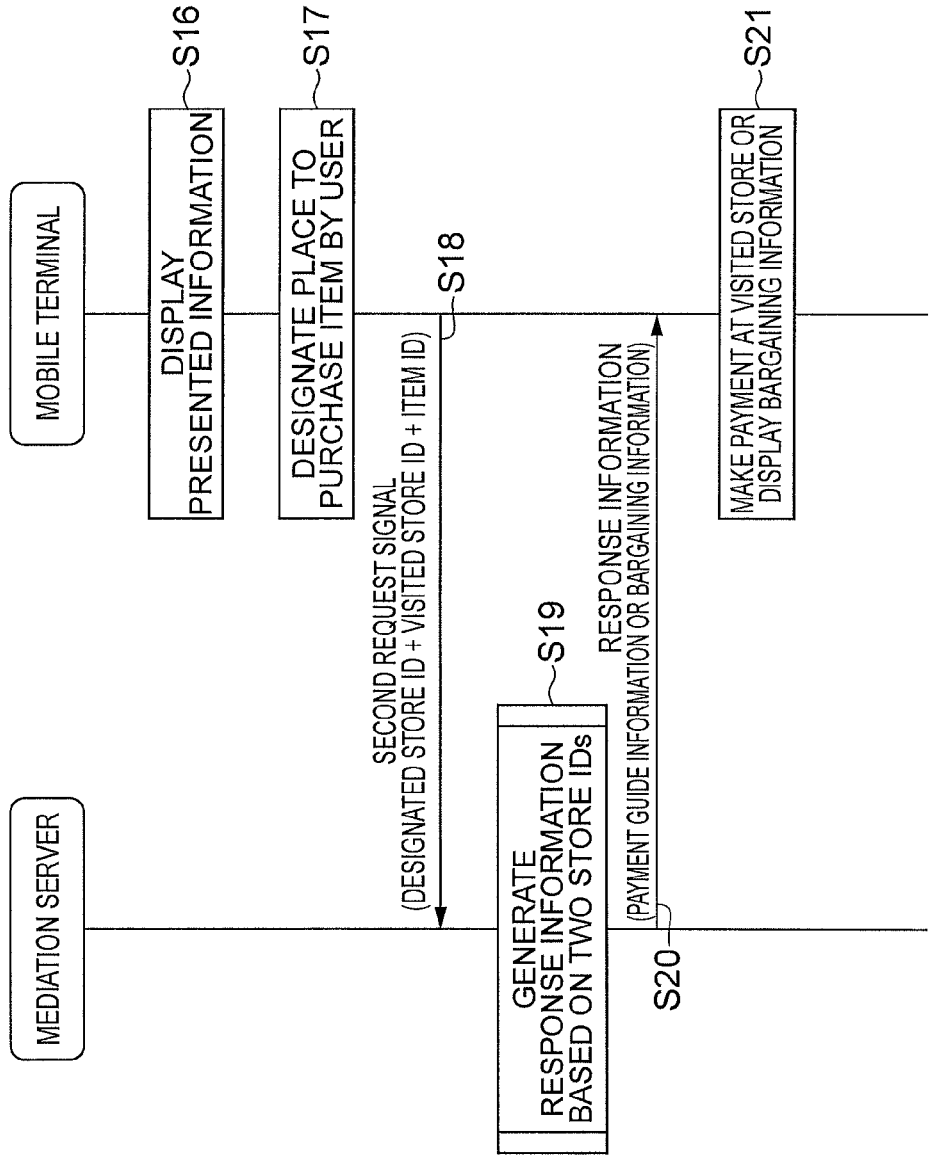
FIG. 10 is a sequence chart showing an operation of the purchase support system shown in FIG. 1.

When the user who has viewed the presented information designates a place to purchase the item, the process is performed as shown in FIG. 10. Because the presented information is stored in the mobile terminal 10, the user may purchase the item by operating the screen after moving to a place different from the visited store (at home, at a coffee shop etc.). When the user designates the store to purchase the item through the mobile terminal 10 (Step S17), the second store information acquiring unit 16 acquires the designated store ID indicating the store and further acquires the visited store ID and the item ID. Then, the second request transmitting unit 17 generates the second request signal containing those IDs and transmits the signal to the mediation server 30 (Step S18).

Figure 11:
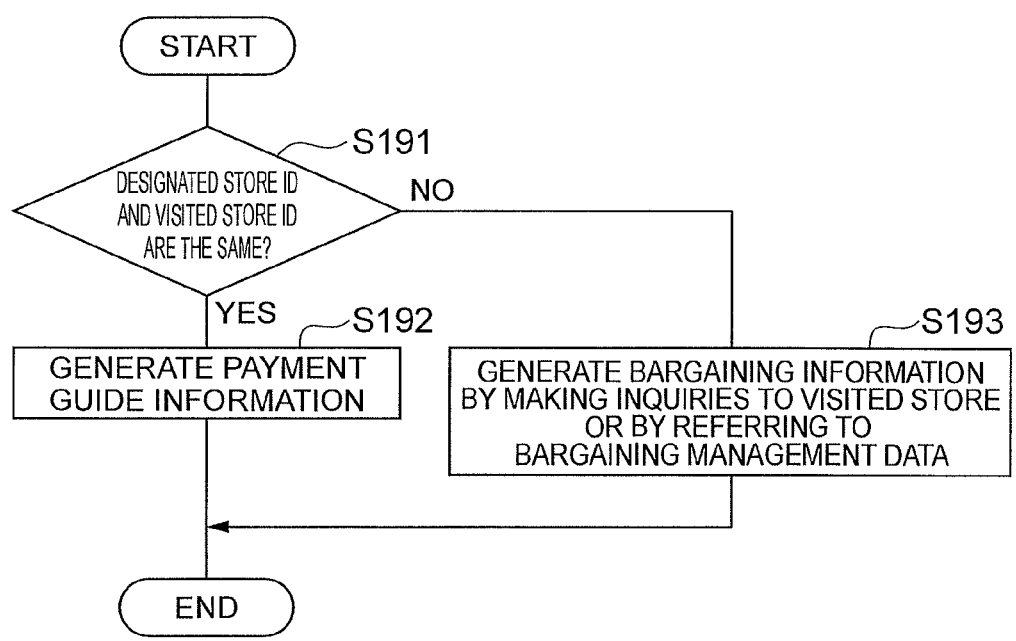
FIG. 11 is a flowchart showing details of a response information generating process shown in FIG. 10.

In the mediation server 30, the second request receiving unit 32 receives the second request signal (receiving step). Then, the response information generating unit 36 generates the response information based on the designated store ID, the visited store ID and the item ID extracted from the request signal (Step S19). This process is described in detail with reference to FIG. 11.

First, the response information generating unit 36 determines whether the designated store ID and the visited store ID match or not (Step S191, determination step). When the both IDs are the same (YES in Step S191), the response information generating unit 36 generates payment guide information for guiding the mobile terminal 10 to the payment process at the visited store (Step S192). On the other hand, when the both IDs are different (NO in Step S191), the response information generating unit 36 generates bargaining information for letting a user consider purchase at the visited store by the above-described first or second method or the like (Step S193, generating step). As described earlier, there are various patterns for a specific procedure to generate the bargaining information.

Referring back to FIG. 10, after the response information is generated, the response information transmitting unit 37 transmits the response information to the mobile terminal 10 (Step S20, transmitting step).

In the mobile terminal 10, the response information receiving unit 18 receives the response information (payment guide information or bargaining information). In the case where the payment guide information is received, the mobile terminal 10 accesses the online payment site of that store in order to complete the payment at the visited store (Step S21). The user makes a credit card payment through the site and presents the result to a sales associate in the store, and can thereby obtain the item immediately.

On the other hand, in the case where the bargaining information is received, the mobile terminal 10 displays the bargaining information on the monitor as shown in the example of FIG. 4 (Step S21). The detail of the service offered from the visited store at the purchase of the item is thereby presented to the user so as to provide the user with an opportunity to reconsider a store to purchase the item. This means that the visited store makes bargaining with the user in order to let the user purchase the item from the store.

The user then decides to purchase the item from the visited store, and can obtain the item immediately by making a credit card payment or payment by cash at the store.

In the case where the bargaining management data in the bargaining management table 31*g* contains the upper limit of the discount amount and the accumulated amount, when the item is sold at the visited store based on the bargaining information, the process of updating the bargaining management data is performed. Specifically, the mediation server 30 receives transaction information indicating the store (visited store), the user, the item, the payment amount and the discount amount related to the transaction from the payment server 50 or the store server 20 of the visited store. Then, a specified update means (not shown) in the mediation server 30 specifies the bargaining management data corresponding to the transaction information from the bargaining management table 31*g* and adds the discount amount indicated by the transaction information to the total discount amount of the specified data.

The user may access the online shopping site of the originally designated store (store different from the visited store) by performing an operation to cancel the screen of the bargaining information and then obtain the item. Note that, however, the user needs to wait for the item to be shipped to the user's house. In this case, the visited store can obtain a predetermined amount of remuneration from the different store. In the example of FIG. 3, the store C can obtain ¥300 when the user purchases the presented item S from the store A, and obtain ¥250 when the user purchases the presented item S from the store B.

In the case where the bargaining management data in the bargaining management table 31*g* specifies the upper limit of the remuneration base, the update process related to the remuneration received by the visited store is performed. Specifically, the mediation server 30 receives store remuneration information indicating the visited store and the remuneration to be paid to the store from the shopping server 40. Then, a specified update means (not shown) in the mediation server 30 specifies the bargaining management data corresponding to the visited store from the bargaining management table 31*g* and adds the remuneration amount indicated by the information to the upper limit of the specified data. At this time, the update means may add a result of subtracting the margin to be paid to an administrator of the purchase support system 1 from the remuneration amount to the upper limit.

Note that, in the case where the bargaining management data specifies the upper limit of the remuneration base, the remuneration corresponding to the reduced price may be given to the visited store only when the visited store presents price reduction to a user and then the item is sold, rather than giving the remuneration to the visited store without condition. In other words, the purchase support system 1 may be configured so that only the remuneration corresponding to the total discount amount indicated by the bargaining management data is paid to the visited store. It is thereby possible to give the motivation to obtain the remuneration to the store and provide the opportunity for price reduction to a user who visits the store.

Figure 12:
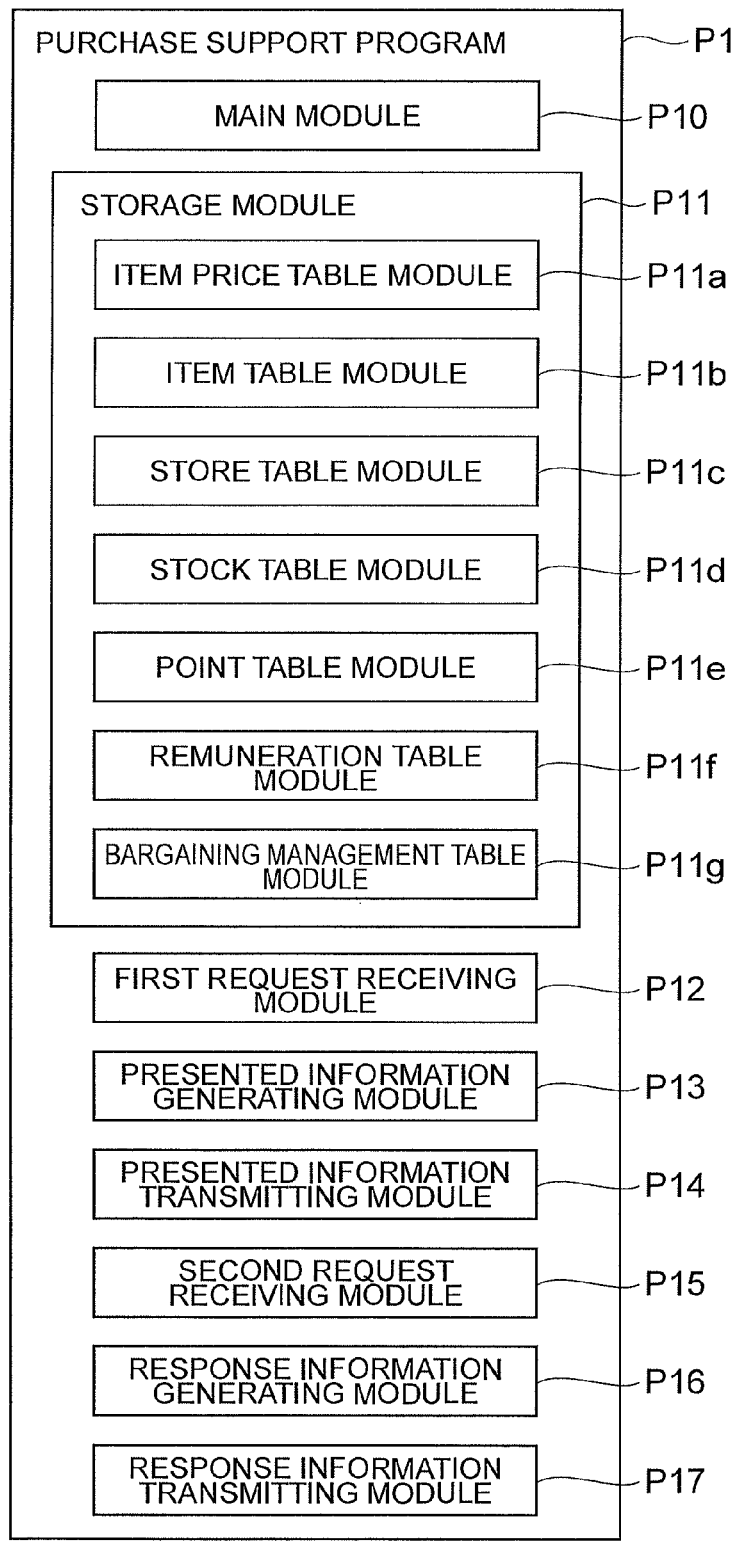
FIG. 12 is a diagram showing a configuration of a purchase support program according to an embodiment.

Hereinafter, a purchase support program for causing a computer to function as the mediation server 30 is described with reference to FIG. 12.

The purchase support program P1 includes a main module P10, a storage module P11, a first request receiving module P12, a presented information generating module P13, a presented information transmitting module P14, a second request receiving module P15, a response information generating module P16, and a response information transmitting module P17. The storage module P11 includes an item price table module P11*a*, an item table module P11*b*, a store table module P11*c*, a stock table module P11*d*, a point table module P11*e*, a remuneration table module P11*f*, and a bargaining management table module P11*g*.

The main module P10 is a part that exercises control over the respective functions of the mediation server 30 shown in FIG. 4. The functions implemented by executing the storage module P11, the first request receiving module P12, the presented information generating module P13, the presented information transmitting module P14, the second request receiving module P15, the response information generating module P16 and the response information transmitting module P17 are equal to the functions of the database 31, the first request receiving unit 32, the presented information generating unit 33, the presented information transmitting unit 34, the second request receiving unit 35, the response information generating unit 36 and the response information transmitting unit 37 described above, respectively. The functions implemented by executing the item price table module P11*a*, the item table module P11*b*, the store table module P11*c*, the stock table module P11*d*, the point table module P11*e*, the remuneration table module P11*f* and the bargaining management table module P11*g* are equal to the functions of the item price table 31*a*, the item table 31*b*, the store table 31*c*, the stock table 31*d*, the point table 31*e*, the remuneration table 31*f* and the bargaining management table 31*g* described above, respectively.

The purchase support program P1 may be provided in the form of being stored in a recording medium such as CD-ROM and DVD-ROM or semiconductor memory, for example. Further, the purchase support program P1 may be provided through a communication network as a computer data signal superimposed onto a carrier wave.

As described above, according to this embodiment, it is determined whether the visited store and the designated store match or not and, when the both stores do not match, the bargaining information indicating the service for the item offered by the visited store is transmitted to the mobile terminal 10 of a user. The transmission of the bargaining information is one aspect for the visited store to make bargaining with a user, and the visited store can thereby let the user reconsider the place to purchase the item. In other words, when a user intends to purchase an item recognized in the visited store from another store, it is possible to provide the visited store with an opportunity to make bargaining with the user. Further, the user can purchase the item with the better condition based on bargaining without directly making bargaining with the store.

Hereinbefore, the present invention has been described in detail with respect to the embodiment thereof. However, the present invention is not limited to the above-described embodiment. Various changes and modifications may be made therein without departing from the scope of the invention.

Although the store-related information that is transmitted from the mobile terminal 10 to the mediation server 30 is a store ID in the above-described embodiment, another kind of information may be used as the store-related information. For example, position information (latitude and longitude) indicating the position of the mobile terminal 10 may be used as the store-related information as described earlier. In this case, the presented information generating unit 33 of the mediation server 30 compares the position indicated by the position information with store data (specifically, the address or map information of the store) in the store table 31c and specifies the store where the mobile terminal 10 is located as the visited store. Then, the presented information generating unit 33 generates the presented information as described above using the store ID of the specified visited store. In this manner, in the case of specifying the visited store based on the position information of the mobile terminal 10, the visited store can be specified without need to prepare information for identifying the store embedded in a two-dimensional barcode or IC tag in the store.

Although the item-related information that is transmitted from the mobile terminal 10 to the mediation server 30 is photographic data in the above-described embodiment, another kind of information may be used as the item-related information. For example, the mobile terminal 10 may be configured to read the item name or catalogue ID embedded in an item tag on the terminal side and transmit the read information to the mediation server 30. Further, the mobile terminal 10 may transmit the item name or the catalogue ID that is previously saved as a bookmark or favorite in the terminal to the mediation server 30. In this case, the presented information generating unit 33 of the mediation server 30 can generate the presented information using the item name or the catalogue ID as it is.

The purchase support system 1 may be configured so that a specified fee is paid from the visited store to an administrator of the mediation server 30 when a user purchases an item from the visited store as a result of offering the bargaining information. In this case, the mediation server 30 further includes a payment recording means (not shown).

The payment recording means receives bargaining success information indicating that a user has purchased an item from the visited store after offering the bargaining information from the mobile terminal 10 or the payment server 50 that has executed a credit card payment at the visited store. Then, based on the bargaining success information, the payment recording means generates payment information indicating a specified amount to be paid from the visited store to an administrator of the purchase support server, and stores the payment information into a specified table (not shown) in the database 31. The amount of payment from each store to the administrator is counted and fixed based on regular batch processing, for example.

Although the mediation server 30 includes the database 31 in the above-described embodiment, the database may be placed in a server or a system different from the mediation server. Further, the tables in the database may be arranged in a distributed manner. In such a case, the mediation server accesses the database through a communication network.

Although price data in the item price table 31a indicates the base price of an item and the presented information generating unit 33 adds the remuneration amount to the base price in the above-described embodiment, the remuneration amount may be included into the purchase cost by another method. Specifically, the price data may include one or more presented price instead of the base price. The presented price is a price presented to a user (potential purchaser) for a specific item by a specific store, and there are at least two types: the presented price not including the remuneration amount (the price presented when a user visits a store) and the presented price including the remuneration amount (the price presented online to a user who has visited another store).

When the store ID of a store selling an item matches the visited store ID, the presented information generating unit 33 may read the presented price not including the remuneration amount as the presented price corresponding to the selling store ID. On the other hand, when the store ID of a store selling an item is different from the visited store ID, the presented information generating unit 33 may read the presented price including the remuneration amount as the presented price corresponding to the selling store ID.

As described above, how to calculate the remuneration amount in the mediation server 30 or how to store the remuneration amount in advance may be determined arbitrarily. In any case, when a store selling an item is different from the store visited, the remuneration amount to be paid from the selling store to the visited store is included in the purchase cost of the item presented to a user.

Although the price data of the real store (visited store) is also stored in the item price table 31a in the above-described embodiment, the same process as in the above-described embodiment can be performed when the price data of the real store does not exist. In this case, when the presented information generating unit 33 generates a list of the presented item data corresponding to the visited store ID and the specified item name or catalogue ID, it does not specify the final purchase cost at the visited store ID. Then, the presented information transmitting unit 34 transmits the presented information in which the purchase cost at the visited store is null to the mobile terminal 10.

Figure 13:
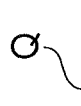
FIG. 13 is a diagram showing a display example of presented information in a mobile terminal according to an alternative example.

In this case, the presented information is displayed as the screen Q as shown in FIG. 13 on the mobile terminal 10. The screen Q is displayed when a user visits the store C, just like the screen P in FIG. 3. Although the total price at the store C is blank because the purchase cost at the visited store C is null in this alternative example, the user can know the selling price at the store C from the price tag that is right in front of the user, and therefore no problem arises when the purchase cost at the visited store is not displayed on the mobile terminal 10.

After that, when the user selects either of the stores A and B which is different from the visited store on the screen Q, the response information generating unit 36 generates the bargaining information. Because the price data at the visited store does not exist in this alternative example, the response information generating unit 36 acquires the total price (purchase cost) at the store selected on the screen Q from the mobile terminal 10 or calculates it in the same manner as in the presented information generating unit 33 and then generates the bargaining information by referring to the total price (purchase cost).

Figure 14:
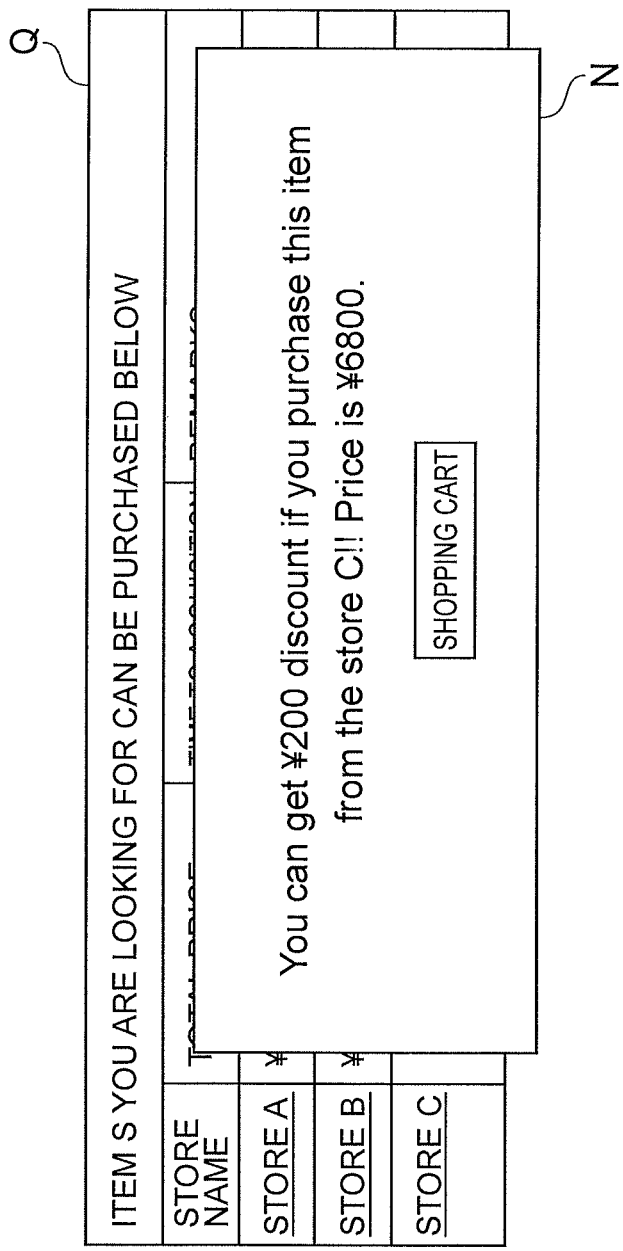
FIG. 14 is a diagram showing a display example of bargaining information in a mobile terminal according to an alternative example.

For example, the response information generating unit 36 may generate the bargaining information indicating that an item can be purchased from the visited store at the same price as the purchase cost in the selected store. When the user selects the store A on the screen Q shown in FIG. 13, the bargaining information indicating that the item S can be purchased from the visited store C at the same price as in the store A, and the screen N as shown in FIG. 14 is displayed on the mobile terminal 10. When the user selects the store B on the screen Q, the screen indicating that the item S can be purchased from the visited store C at ¥6250 is displayed. Such processing is based on the assumption that the price at the online shop is close to the price at the real store, and it is set so that the price at the real store becomes closer to the price at the online shop by this processing. Alternatively, the response information generating unit 36 may generate the bargaining information by accepting the detail of the service input in the visited store as it is in the same manner as in the above-described embodiment.

According to this alternative example, the bargaining information can be provided to a user even when a database related to the real store is not prepared. It is thereby possible to give an opportunity to make bargaining with a user to the real store (visited store) with less costs and efforts required to prepare the database.

In this alternative example, when a user purchases an item from the visited store in accordance with the bargaining information, the mediation server 30 may receive information (for example, information in which the store, item, purchase price and discount amount are associated with one another) about the purchase from the store server 20 of the visited store and store them into a specified database. By capturing information about the purchase at the real store in this manner, it is possible to analyze various trends related to item purchase by a user.

REFERENCE SIGNS LIST

1 . . . Purchase support system, 10 . . . Mobile terminal, 11 . . . First store information acquiring unit, 12 . . . Item-related information acquiring unit, 13 . . . Request transmitting unit, 14 . . . Presented information receiving unit, 15 . . . Display unit, 16 . . . Second store information acquiring unit, 17 . . . Second request transmitting unit, 18 . . . Response information receiving unit, 20 . . . Store server, 30 . . . Mediation server (purchase support server), 31 . . . Database, 31*a* . . . Item price table, 31*b* . . . Item table, 31*c* . . . Store table, 31*d* . . . Stock table, 31*e* . . . Point table, 31*f* . . . Remuneration table, 31*g* . . . Bargaining management table, 32 . . . First request receiving unit, 33 . . . Presented information generating unit, 34 . . . Presented information transmitting unit, 35 . . . Second request receiving unit (receiving means), 36 . . . Response information generating unit (determining means, generating means), 37 . . . Response information transmitting unit (transmitting means), 40 . . . Shopping server, 50 . . . Payment server, P1 . . . Purchase support program, P10 . . . Main module, P11 . . . Storage module, P11*a* . . . Item price table module, P11*b* . . . Item table module, P11*c* . . . Store table module, P11*d* . . . Stock table module, P11*e* . . . Point table module, P11*f* . . . Remuneration table module, P11*g* . . . Bargaining management table module, P12 . . . Request receiving module, P13 . . . Presented information generating module, P14 . . . Presented information transmitting module, P15 . . . Request receiving module, P16 . . . Response information generating module, P17 . . . Response information transmitting module

The invention claimed is:

1. A purchase support server comprising:
a non-transitory memory operable to store program code; and
a processor operable to read the program code, and operate as instructed by the program code to:
receive visited store information for identifying a visited store that a user physically visits;
retrieve, from at least one image of at least one item photographed by the user using at least one camera of a mobile terminal, item-related information for identifying an item that is recognized by the user at the visited store;
generate, in response to retrieving the at least one image, a webpage indicating an online store selling the item and the visited store, indicating times until the item is shipped respectively from the online store and the visited store and is acquired by the user, and indicating points to be obtained by the user for purchasing the item respectively from the online store and the visited store, by searching a database for the generated webpage based on the received visited store information and the received item-related information;
transmit the generated webpage to the mobile terminal, the generated webpage comprising links to access sites for purchasing the item respectively from the online store and the visited store, and item-selling store information for identifying the online store and the visited store being embedded in the respective links, wherein the mobile terminal displays the transmitted webpage, on a screen;
receive the item-selling store information embedded in a link, among the links, from the mobile terminal, in response to the link included in the transmitted webpage that is displayed on the mobile terminal being designated by the user;
determine whether the visited store and a store that is identified by the received item-selling store information match;
generate service information indicating a service that is offered by the visited store to the user that purchases the item at the visited store instead of the store identified by the received item-selling store information; and
transmit the generated service information to the mobile terminal, in response to the determination that the visited store and the store identified by the received item-selling store information do not match, wherein the mobile terminal display the transmitted service information as a pop-up window, on the screen.

2. The purchase support server according to claim 1, wherein the processor is further operable to operate as instructed by the program code to:
transmit inquiry information for making inquiries about a detail of the service, to a terminal of the visited store;
receive input information indicating the detail of the service in response to the inquiry information, from the terminal; and
generate the service information based on the input information.

3. The purchase support server according to claim 2, wherein the processor is further operable to operate as instructed by the program code to:
determine whether the detail of the service indicated by the input information is within a predetermined allowable range; and
generate the service information in response to the determination that the detail of the service is within the predetermined allowable range.

4. The purchase support server according to claim 1, wherein the processor is further operable to operate as instructed by the program code to:
extract store service information indicating a detail of the service, from a database; and
generate the service information based on the extracted store service information.

5. The purchase support server according to claim 4, wherein the store service information comprises an accumulated value of an offer of the service and an upper limit value of the offer of the service, and
the processor is further operable to operate as instructed by the program code to generate the service information based on the extracted store service information in response to the accumulated value being less than or equal to the upper limit value.

6. The purchase support server according to claim 1, wherein the processor is further operable to operate as instructed by the program code to:

extract store service information indicating a detail of the service, from a database, the store service information comprising an accumulated value of an offer of the service and an upper limit value of the offer of the service, the upper limit value being set based on remuneration that is received by the visited store from another store; and generate the service information based on the extracted store service information in response to the accumulated value being less than or equal to the upper limit value.

7. The purchase support server according to claim 1, wherein the processor is further operable to operate as instructed by the program code to:

generate user remuneration information indicating an amount of remuneration to the user; and store the user remuneration information into a database in response to the reception of the item-related information from the mobile terminal at the visited store.

8. The purchase support server according to claim 1, wherein processor is further operable to operate as instructed by the program code to:

generate payment information indicating an amount of payment from the visited store to an administrator of the purchase support server based on information indicating purchase; and store the payment information into a database in response to the user of the mobile terminal having received the service information purchasing the item from the visited store.

9. A purchase support method executed by a purchase support server, the method comprising:

receiving visited store information for identifying a store that is visited by a user as a visited store;

retrieving, from at least one image of at least one item photographed by the user using at least one camera of a mobile terminal, item-related information for identifying an item that is recognized by the user at the visited store;

generating, in response to retrieving the at least one image, a webpage indicating an online store selling the item and the visited store, indicating times until the item is shipped respectively from the online store and the visited store and is acquired by the user, and indicating points to be obtained by the user for purchasing the item respectively from the online store and the visited store, by searching a database for the webpage based on the received visited store information and the received item-related information;

transmitting the generated webpage to the mobile terminal, the generated webpage comprising links to access sites for purchasing the item respectively from the online store and the visited store, and item-selling store information for identifying the online store and the visited store being embedded in the respective links, wherein the mobile terminal displays the transmitted webpage, on a screen;

receiving the item-selling store information embedded in a link, among the links, from the mobile terminal, in response to the link included in the transmitted webpage that is displayed on the mobile terminal being designated by the user;

determining whether the visited store and a store that is identified by the received item-selling store information match;

generating service information indicating a service that is offered by the visited store to the user that purchases the item at the visited store instead of the store identified by the received item-selling store information; and transmitting the generated service information to the mobile terminal, in response to the determination that the visited store and the store identified by the received item-selling store information do not match, wherein the mobile terminal display the transmitted service information as a pop-up window, on the screen.

10. The purchase support server according to claim 1, wherein the at least one photographed image is a scale-up image of the item showing information that uniquely identifies the item.

11. The purchase support server according to claim 1, wherein the at least one photographed image is an image of an item tag, wherein the item tag is embedded with a catalogue identifier that uniquely identifies the item.

12. The purchase support server according to claim 1, wherein the at least one photographed image is an image of an item tag, wherein the item tag is embedded with an item name that uniquely identifies the item.

\* \* \* \* \*